United States Patent
Gottin et al.

(10) Patent No.: US 11,403,525 B2
(45) Date of Patent: Aug. 2, 2022

(54) USING REINFORCEMENT LEARNING TO DYNAMICALLY TUNE CACHE POLICY PARAMETERS

(71) Applicant: EMC IP HOLDING COMPANY LLC, Hopkinton, MA (US)

(72) Inventors: Vinicius Michel Gottin, Rio de Janeiro (BR); Tiago Salviano Calmon, Rio de Janeiro (BR); Jonas Furtado Dias, Beecroft (AU); Alex Laier Bordignon, Rio de Janeiro (BR); Daniel Sadoc Menasché, Rio de Janeiro (BR)

(73) Assignee: Dell Products, L.P., Hopkinton, MA (US)

( * ) Notice: Subject to any disclaimer, the term of this patent is extended or adjusted under 35 U.S.C. 154(b) by 312 days.

(21) Appl. No.: 16/889,104

(22) Filed: Jun. 1, 2020

(65) Prior Publication Data
US 2021/0374523 A1    Dec. 2, 2021

(51) Int. Cl.
*G06F 16/22*     (2019.01)
*G06N 3/08*      (2006.01)
*G06N 3/04*      (2006.01)
*G06F 16/2455*   (2019.01)

(52) U.S. Cl.
CPC ............ *G06N 3/08* (2013.01); *G06F 16/22* (2019.01); *G06F 16/24552* (2019.01); *G06N 3/04* (2013.01)

(58) Field of Classification Search
CPC ... G06F 16/172; G06F 16/22; G06F 16/24552
See application file for complete search history.

(56) References Cited

U.S. PATENT DOCUMENTS

2010/0082513 A1\*  4/2010  Liu .................... G06N 3/006
                                                  706/46

\* cited by examiner

*Primary Examiner* — Yong J Choe
(74) *Attorney, Agent, or Firm* — Anderson Gorecki LLP

(57) ABSTRACT

Reinforcement learning is used to dynamically tune cache policy parameters. The current state of a workload on a cache is provided to a reinforcement learning process. The reinforcement learning process uses the cache workload characterization to select an action to be taken to adjust a value of one of multiple parameterized cache policies used to control operation of a cache. The adjusted value is applied to the cache for an upcoming time interval. At the end of the time interval, a reward associated with the action is determined, which may be computed by comparing the cache hit rate during the interval with a baseline hit rate. The process iterates until the end of an episode, at which point the parameters of the cache control policies are reset. The episode is used to train the reinforcement learning policy so that the reinforcement learning process converges to a trained state.

20 Claims, 11 Drawing Sheets

USING REINFORCEMENT LEARNING TO DYNAMICALLY TUNE CACHE POLICY PARAMETERS

FIELD

This disclosure relates to computing systems and related devices and methods, and, more particularly, to using reinforcement learning to dynamically tune cache policy parameters.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of dynamically tuning cache policy parameters includes parameterizing caching systems using reinforcement learning. Baseline metrics are precomputed and various approaches at cache policy parameterization are compared against the baseline metrics. For example, if the baseline metric is based on a cache hit rate, the various alternative cache parameterization approaches are compared against the baseline hit rate rather than learning the hit rate directly. A reinforcement learning model is used to predict the best cache policy parametrization given the current system state. In implementations where the cache policy has multiple parameters, in some embodiments the reinforcement learning process is configured to optimize only one parameter at each iteration, reducing the action space drastically and allowing multiple cache parameters to be dynamically tuned in a principled manner.

BRIEF DESCRIPTION OF THE DRAWINGS

FIG. 4 is a functional block diagram showing an example way of creating a state vector from raw trace data by a cache composite state generator, according to some embodiments.

DETAILED DESCRIPTION

Figure 1:
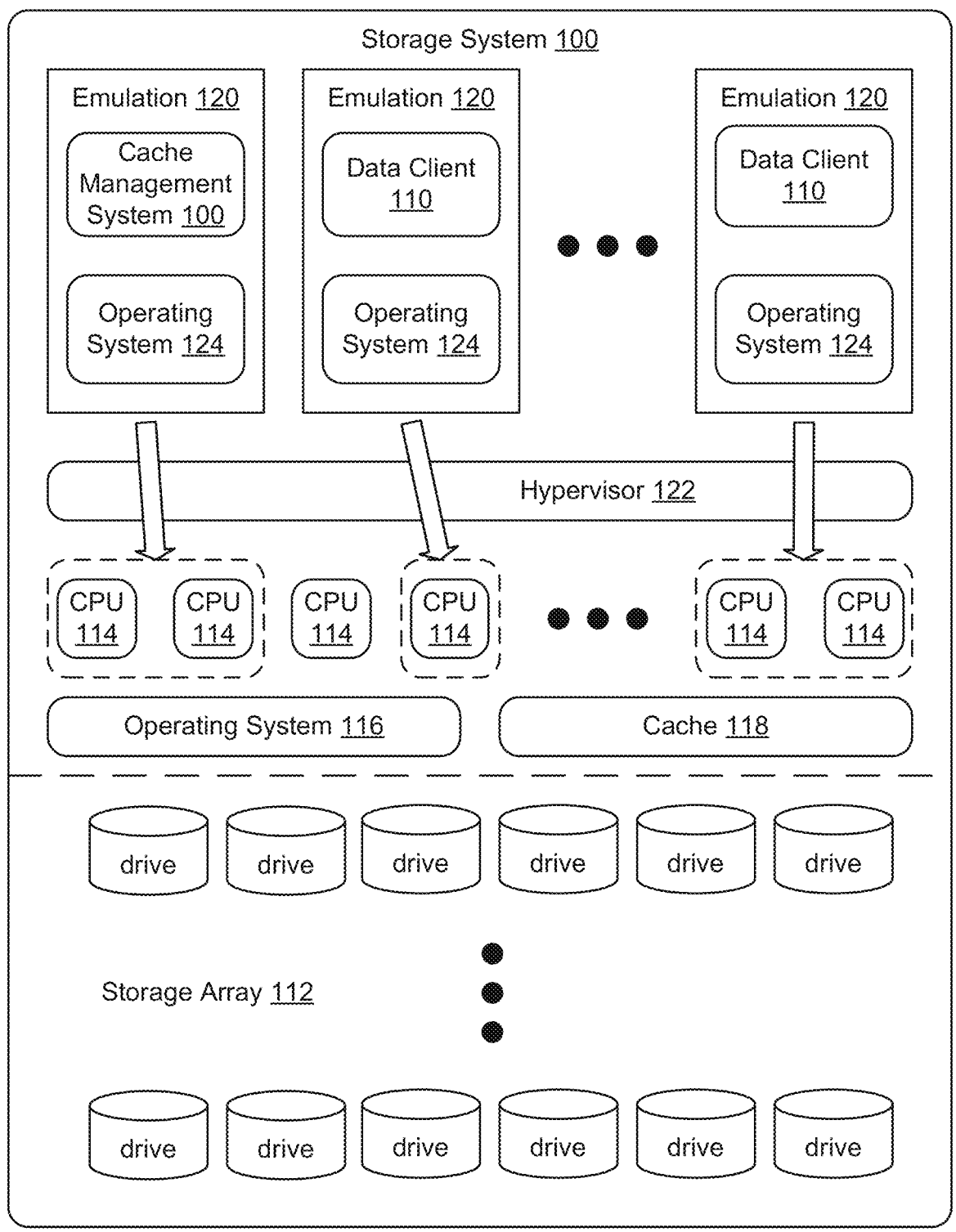
FIG. 1 is a functional block diagram of an example storage system, according to some embodiments.

FIG. 1 is a functional block diagram of an example storage system 100, in which data clients 110 have access to storage resources provided by a storage array 112. As shown in FIG. 1, in some embodiments the storage system 100 has physical resources including a number of CPU processor cores 114, operating system 116, cache 118, and other physical resources.

Storage array 112 may be implemented using numerous physical drives using different types of memory technologies. In some embodiments the drives used to implement storage array 112 are implemented using Non-Volatile Memory (NVM) media technologies, such as NAND-based flash, or higher-performing Storage Class Memory (SCM) media technologies such as 3D XPoint and Resistive RAM (ReRAM). Storage array 112 may be directly connected to the other components of the storage system 100 or may be connected to the other components of the storage system 100, for example, by an InfiniBand (IB) bus or fabric.

Data clients 110 act as hosts and provide access to the storage resources provided by storage array 112. Examples of data clients 110 may include but are not limited to file servers, email servers, block servers, and databases. The storage system 100 maintains data for the data clients 110 in storage array 112. For example, data client 110 may write data to the storage system 100 and read data from the storage system 100 in order to perform various functions.

In some embodiments, data clients 110 execute in emulations 120 such as a virtual machine instantiated in the context of the storage system 100. In some embodiments, a hypervisor 122 abstracts the physical resources of the storage system 100 from emulations 120, and allocates physical resources of storage system 100 for use by the emulations 120. Each emulation 120 has an emulation operating system 124 and one or more application processes running in the context of the emulation operating system 124.

Logical storage devices (LUNs) are created and presented to the data clients 110 for use by the data client 110 to perform IO operations. In some embodiments, the LUN appears to the data client 110 as a single data storage device having a set of contiguous fixed-size LBAs (logical block addresses) on which data used by the data client 110 resides and can be stored. However, the actual resources used by the storage system to store the data may reside at non-contiguous addresses (tracks) on various different managed drives of storage array 112. In some embodiments, the storage system 100 maintains metadata that indicates, among various things, mappings between the LUN and the back-end tracks on drives of storage array 112.

When an IO request is received, the storage system 110 first tries to service the IO request from the cache 118. If the data associated with the request is stored in cache 118, the storage system 110 will be able to service the request much faster than if the data needs to be retrieved from managed drives of storage array 112. Accordingly, correctly placing data with a high probability of being requested on fast memory media implementing cache 118 can substantially reduce the response times of input/output (I/O) requests.

Caching is a key component of minimizing response latency on requests on a storage system, where the main point is to keep data blocks ready on devices that have high access speed. In general, these devices are expensive and cache space is limited. To make the most of the cache, a variety of techniques are used that try to cache data that will be reused and remove data that is expected to be no longer used.

The techniques and algorithms used for cache optimization are often implemented in hardware and are therefore mostly of low execution complexity, making it difficult to apply machine learning directly to the caching algorithm. Accordingly, in some embodiments apply machine learning is used to optimize the parameters of caching policies implemented using the hardware cache management system. In some embodiments, an objective is to perform frequent updates to optimize the cache algorithm parameters. The concepts described herein for cache parameter optimization can be coupled with any parameterized caching policy wherein the dynamic adjustment of parameters is beneficial.

Caching is at the core of most modern computer systems to cope with the memory-access hierarchy. Since dynamic random-access memory (DRAM) hardware is expensive, physical cache resources are often limited. Further, resources meant for caching, such as cache 118 of FIG. 1, are usually shared among multiple beneficiaries. Accordingly, it would be beneficial to be able to optimize cache usage by automatically tuning caching policies. However, in practice tuning cache policies is difficult, because the correct set of cache policies must balance between the gains that can be achieved due to changes on caching policy parameters, as well as for the costs of frequent changes, e.g., due to cache transient dynamics which are hard to predict when a caching policy change occurs. In addition, there is a tradeoff between exploiting learned caching policy parametrizations given the inferred disk access patterns and exploring novel parametrizations. In some embodiments, reinforcement learning is used to automatically tune cache policy parameters.

Figure 2:
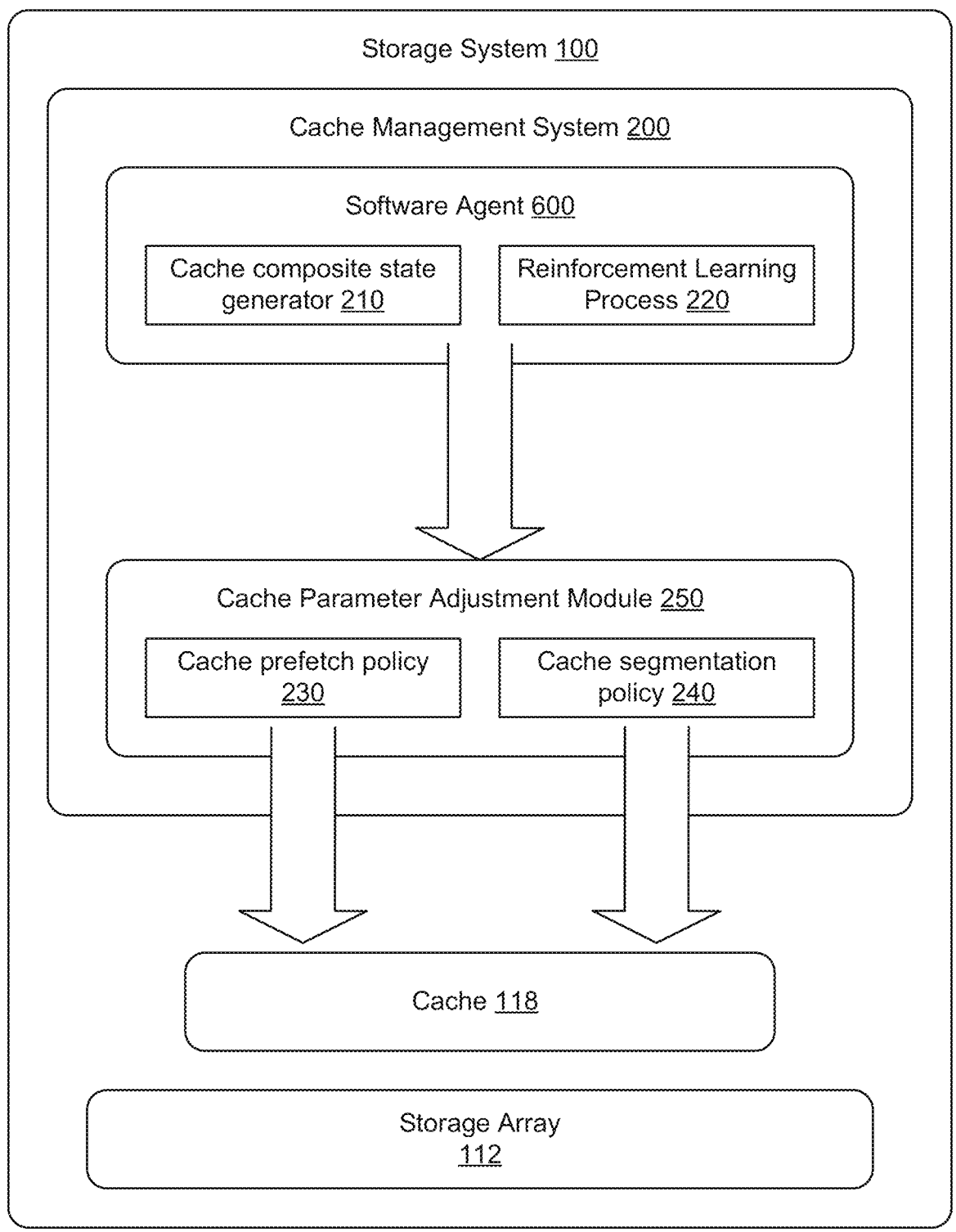
FIG. 2 is a functional block diagram of an example storage system showing the cache management aspects in greater detail, according to some embodiments.

FIG. 2 is a functional block diagram of an example storage system 100 showing the cache management aspects in greater detail, according to some embodiments. As shown in FIG. 2, in some embodiments the storage system 100 includes a cache management system 200 configured to dynamically adjust operational parameters of the cache 118 based on reinforcement learning. In some embodiments, as discussed in greater detail below, the cache management system 200 includes a cache composite state generator 210 and a reinforcement learning process 220. The reinforcement learning process 220 uses information from the composite state generator 210 about the current operational conditions of the cache 118, and uses that information to set operational parameters of the cache 118 by a cache parameter adjustment module 250, such as a cache prefetch policy 230 and a cache segmentation policy 240. Each of these components is discussed in greater detail below. Although an implementation will be described in which the operational parameters that are set by the reinforcement learning process 220 are the cache prefetch policy 230 and cache segmentation policy 240, in some embodiments other cache operational parameters are adjusted in addition to or instead of the cache prefetch policy 230 and cache segmentation policy 240.

According to some embodiments, a method of dynamically optimizing cache policy parameters is implemented using reinforcement learning. To enable a specific example to be described, an implementation will be described which focuses on the problem of dynamically tuning the prefetch policy as applied to a cache system. The cache policy parameterization, for example the length of the prefetch, is allowed to change in regular time intervals. In some embodiments, the cache policies are adjusted every five minutes, which was empirically observed to correspond to a good compromise between computational overhead and fast responsiveness to changing disk access patterns. Other embodiments may use time intervals with other durations.

In some embodiments, disk access patterns are learned using a cache composite state generator 210 and used as input to a reinforcement learning process 220. The reinforcement learning process 220 receives, as input, a state vector that contains information about the current and past states of the trace of requests (I/O traces) on the cache 118. Then, the reinforcement learning process 220 decides, based on the current state, how to parametrize the cache prefetch policy 230 and/or cache segmentation policy 240 for an upcoming time interval.

One aspect of the reinforcement learning process enables the reinforcement learning process to account for the changes in the disk request patterns, e.g., due to non-stationary behavior. When a new application emerges, for instance, access patterns on the cache 118 change and the reinforcement learning process 220 must eventually determine that it is worth changing the parameterization of the caching policy to cope with the new patterns. As an illustrative example, such patterns may involve more sequential accesses to contiguous disk addresses than the previous observations, requiring larger prefetches.

Learning the parametrization of cache policies poses several problems. For example, changes in the access patterns should be reflected in changes in caching policies. When a new application begins using the storage system, the past historical data on disk accesses will not reflect the patterns of the new application. Frequently retraining the model takes time and resources and must be done with parsimony. Additionally, changes in cache policy parameters have both short term and long-term impacts. Short term impacts are easier to predict through a model, but the long-term impacts are more challenging to predict and account for, and would potentially leverage higher gains. For example, increasing the length of the prefetch can lead to an instantaneous increase in hit rate, but can cause the eviction of a content which, in the long term, will be frequently requested and costly to retrieve again.

To further complicate matters, dynamic optimization of multiple cache parameters is difficult to successfully implement. Usually there are multiple policy parameters that can be adjusted in modern caching policies, and the joint adjustment is non-trivial because changing one parameter of one policy may require changes to another parameter of a different policy. Such parameters include, for instance, the look-ahead size and the segmentation of the caches into multiple parts dedicated to different flows. In some embodiments, reinforcement learning is used to automatically decide which policies should be prioritized, balancing between exploitation of known good strategies and exploration of novel ones.

In some embodiments, the reinforcement learning process 220 determines the optimal cache policy parameters to use at the next time interval, accounting for interdependencies across time intervals (present and future rewards) and through continuous learning (exploration and exploitation). The history of states are obtained and corresponding hit rates and cache pollution levels are determined as observed by the cache composite state generator 210. The reinforcement learning process 220 then uses the current state of the cache 118 to determine the current cache policy parameterization for the cache 118 that will maximize cache metrics of interest. Example metrics may include maximizing cache hit rate and minimizing cache pollution over a future horizon.

As used herein, the term "cache policy" is used to refer to a policy that determines which contents must be cached and which contents must be evicted when needed.

As used herein, the term "parameterized cache policy" is used to refer to a cache policy that has parameters that can be automatically or manually changed to adjust operation of the cache.

As used herein, the term "tuning policy" is used to refer to a policy to tune the cache parameters. Given the current system state, a tuning policy must determine how to parameterize the cache so as to maximize utility (e.g., hit rate).

As used herein, the term "LRU (Least Recently Used) cache policy" is used to refer to cache policy according to which the least recently used item is evicted from the cache when a new item not currently stored in the cache arrives and the cache is full (no empty cache slots).

As used herein, the term "look-ahead parameter" is used to refer to the length of the prefetch, i.e. the number of additional items to be retrieved (sequentially) after a given request in the cache system. When a request arrives for a particular piece of data, the look-ahead parameter is used to cause that particular piece of data as well as the next number of sequential blocks to be loaded to the cache 118.

As used herein, the term "LRU-look-ahead cache policy" is used to refer to a policy similar to LRU but equipped with a look-ahead parameter which can be dynamically adjusted.

As used herein, the term "SLRU" is used to refer to Segmented LRU, a variant of an LRU cache wherein the cache is divided in two regions: probatory and protected. The probatory region serves to store items that have been requested only once, whereas the protected cache stores the other items. The parameter "alpha" denotes the fraction of the cache 118 reserved for probatory items. Alpha can be dynamically tuned, based on the learned disk access patterns, e.g., if it is envisioned that most of the upcoming requests are only going to be requested once, alpha should be reduced.

As used herein, the term "trace of disk accesses" is used to refer to a sequence of addresses and lengths describing the sequential disk access.

As used herein, the term "SLRU look-ahead" is used to refer to a parameterized cache policy comprising two parameters: the look-ahead and alpha (see above).

As used herein, the term "Markov decision process (MDP)" is used to refer to a mathematical framework for modeling decision-making in situations where outcomes are partly random and partly under the control of a decision maker.

As used herein, the term "DNN (Deep Neural Network)" is used to refer to an artificial neural network with multiple layers between the input and output layers. A deep neural network learns a linear or non-linear mathematical relationship between the input and output during a training phase, in which coefficients are learned for the nodes of the layers, such that each layer can be used to calculate the probability of each output.

As used herein, the term "Q-learning" (Q stands for Quality) is used to refer to an algorithm to train a reinforcement learning agent. Q-learning is a model-free reinforcement learning algorithm configured to learn a policy specifying to an agent what action to take under what circumstances. It does not require a model (hence the connotation "model-free") of the environment, and it can handle problems with stochastic transitions and rewards, without requiring adaptations. For any finite Markov decision process, Q-learning finds an optimal policy in the sense maximizing the expected value of the total reward over any and all successive steps, starting from the current state.

Figure 3:
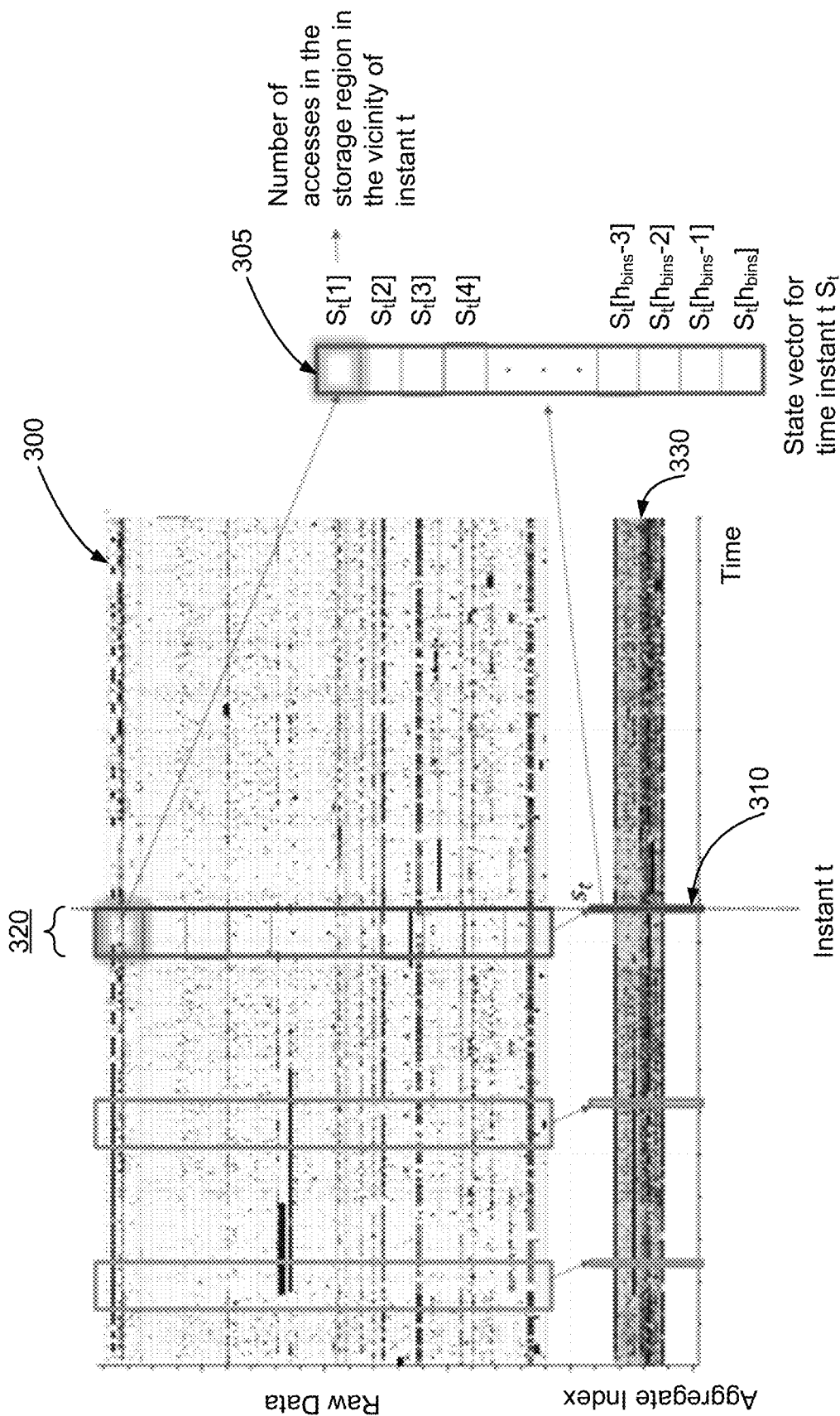
FIG. 3 shows an example of raw trace data, and a functional block diagram showing an example way of creating a state vector from the raw trace data by a cache composite state generator, according to some embodiments.
Figure 4:
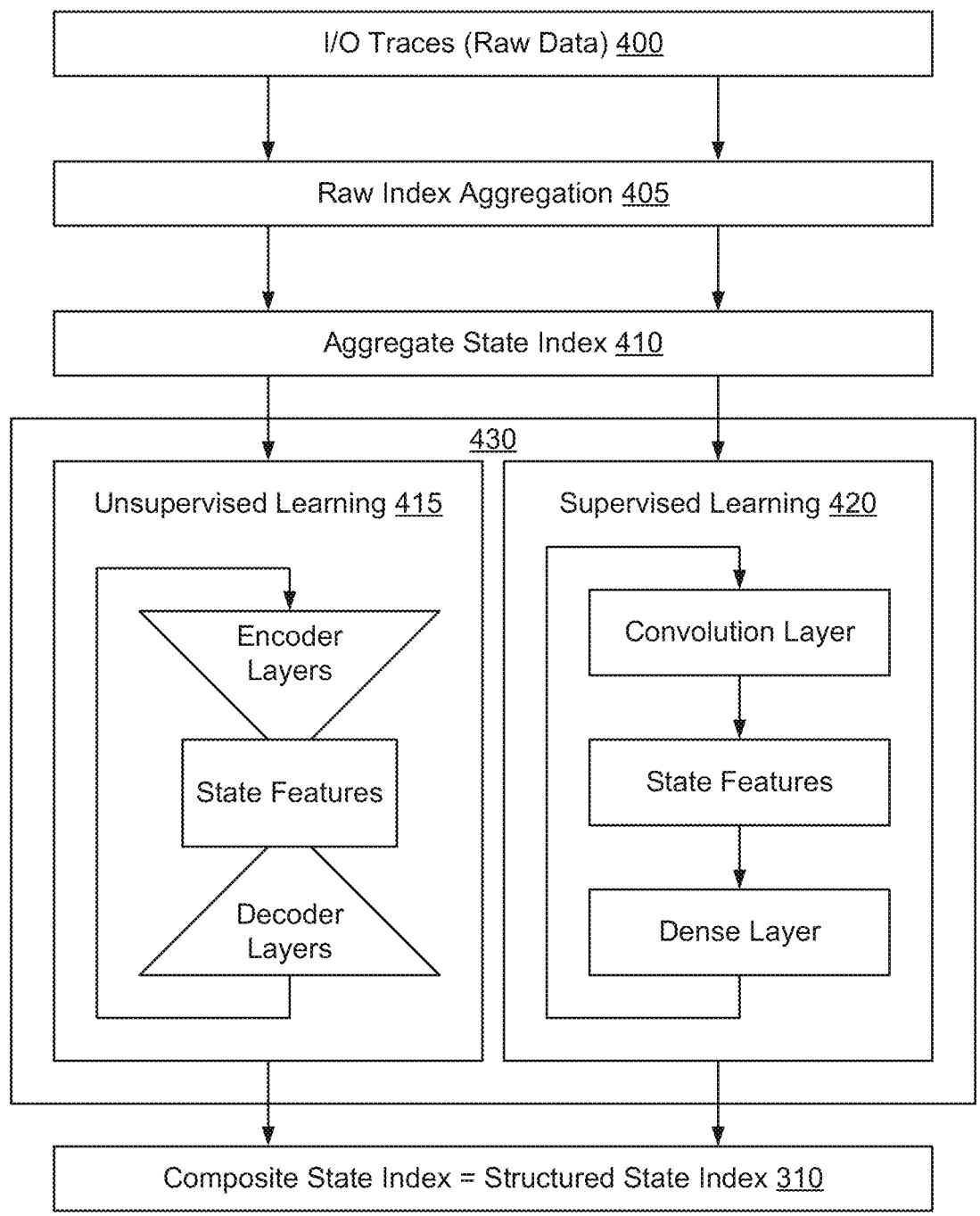
FIG. 4 is a functional block diagram of an example cache composite state generator configured to create a composite state index from state vectors, according to some embodiments.

To enable the regression learning process to be used to adjust the cache prefetch policy 230 and cache segmentation policy 240, it is first necessary to characterize the state of the traffic on the cache 118. FIG. 3 is a functional block diagram showing an example way of aggregating raw index information. FIG. 4 is a functional block diagram of an example cache composite state generator 210 configured to use raw data associated with IO activity on the cache 118 to create a composite state index.

As shown in FIG. 4, in some embodiments, the input/output (IO) raw trace data 300 describing input/output actions on the cache is collected. FIG. 3 (top graph) shows an example collection of raw trace (disk access IO) data 300, in which each row corresponds to an address in the disk, and each data point corresponds to a read or write operation in the address across time. The raw disc access operations are aggregated 305 to form an aggregated state index 310. The aggregate state index is then engineered to emphasize features of interest to form a composite state index 315.

FIG. 4 is a functional block diagram showing an example process of creating a composite state index 315. As shown in FIG. 4, raw IO trace information on cache 118 is collected over time (block 400). To condense this raw trace information, in some embodiments the raw IO trace information is aggregated (block 405). For example, in some embodiments the universe of possible disk addresses is divided into a discrete set of address ranges $S_t[1]$-$S_t[h]$ where h is equal to the number of bins. IO operations on each discrete address range are summed over a lookback period 320 to form an aggregated state vector (block 410) for a time instant $S_t$. The aggregate state index 330 shown in the bottom graph of FIG. 3 is an index of the state vectors over time.

As shown in FIG. 3, in some embodiments one or more learning processes such as an unsupervised learning process 415 and a supervised learning process 420 are used to create a composite state index 310 from the aggregate state index 410. In other embodiments, the aggregate state index 410 is used as the structured state index 310.

As shown in FIG. 4, in some embodiments I/O traces (raw data 130) is aggregated at a raw index aggregation process 405, and the aggregated state index 410 output by the raw index aggregation process 405 is passed to a state index composition process 430. In the embodiment shown in FIG. 4, a composite state index 310 output from the state index composition process 430 is used as the structure state index. Accordingly, as used herein, the term "structured state index" will be used as a generic term. In an embodiment in which a state index composition process 430 is not being used, the term structured state index is used herein to refer to the aggregate state index. In an embodiment in which a state index composition process 430 is being used, the term structured state index is used herein to refer to the composed aggregated structured state index, after the aggregate state index has been further processed by the state index composition process 430.

In some embodiments, the state index composition process 430 is implemented as an unsupervised learning process 415, a supervised learning process 420, or as a combination of both an unsupervised learning process 415 and a supervised learning process 420.

In some embodiments, as shown in FIG. 4, the raw trace data 300 is collected by the cache composite state generator 210 and includes disc access trace data. The aggregate state index 410 is formed from histograms of disk accesses per bin of addresses. The address space is uniformly divided into bins of equal size, where each bin corresponds to a contiguous range of disk addresses. The composite state index is a low dimensionality representation of the aggregate state index, for example after autoencoding. The window of time 320 is used to determine the amount of previous history that is conveyed at each state, depending on the domain.

The aggregate state index 410 representation is then used in (optional) feature enrichment steps to yield an engineered characterization series called a composite state index. Both the simplified and composite state index are referred to herein interchangeably as the structured state index, comprising an appropriate structure to be correlated with the target metric (which in some embodiments is a cache hit-rate prediction). An example is shown in FIG. 3. At the end of this process, the state vector $S_t$ is a vector with relevant features about the patterns of disk access operations on the cache 118 at a time t.

Reinforcement learning algorithms aim at controlling software agents to perform actions in an environment to maximize some notion of cumulative reward. Reinforcement learning is also called approximate dynamic programming, or neuro-dynamic programming.

The environment is typically formulated as a MDP (Markov Decision Process), and techniques from dynamic programming are used to find optimal solutions. One primary difference from classic dynamic programming and reinforcement learning is that reinforcement learning does not assume knowledge of the exact underlying MDP processes, and targets large MDPs where exact methods become impossible to use from a practical standpoint.

There are several algorithms that have been developed to implement reinforcement learning. Table I, set forth below, lists several reinforcement learning algorithms. In some implementations, reinforcement learning can be used to teach an agent to learn an entire process from observation to action by using a deep neural network, without explicitly designing the complete state space or action space.

actions available to the virtual agent are the feasible cache policy parametrizations, and each action produces an instantaneous reward, e.g., hit rate in the current time slot.

The current state vector $s_t$ may encompass information about request history as well as of the cache state, and impacts the action $a_t$ taken by the agent, which in turn affects the instantaneous reward $r_t$. After action $a_t$ is executed, the system moves to state $s_{t+1}$. The overall goal is to maximize the expected discounted reward, which is obtained by accumulating the instantaneous rewards, discounted by a factor which serves to give more weight to near future envisioned rewards.

In some embodiments, a method for dynamically optimizing a parametric cache policy is implemented using reinforcement learning, which is built on top of a Markov decision process. The Markov decision process relies on the following elements:
  environment and state space
  actions
  states and
  rewards.

In some embodiments, a dynamic optimization of parameters is employed using reinforcement learning algorithms such as DQN (Deep Q Network) learning or PPO (Proximal Policy Optimization). Although some embodiments will be described in which the reinforcement learning algorithm is a DQN algorithm, in other embodiments different reinforcement learning algorithms, such as the reinforcement learning algorithms of Table I, may be used.

The current state $s_t$ is a vector of values, i.e., attributes, whose dimension is known as the state dimension. The state index $s_t$ should encompass all information necessary to enable the agent to make a decision about the cache policy parameters. In particular, the agent's decision should depend on the history of disk accesses only through information conveyed by the current state (Markovian property).

In some embodiments, a state index $s_t$ is defined that contains sufficient information to describe the state of the environment at time t and encompass enough information to tune the cache parameters. In some embodiments, the aggre-

TABLE I prominent reinforcement learning algorithms.

| Algorithm | Description | Action Space | State Space | Operator |
|---|---|---|---|---|
| Monte Carlo | Every visit to Monte Carlo | Discrete | Discrete | Sample-means |
| Q-learning | State-action-reward-state | Discrete | Discrete | Q-value |
| SARSA | State-action-reward-state-action | Discrete | Discrete | Q-value |
| Q-learning - Lambda | State-action-reward-state with eligibility traces | Discrete | Discrete | Q-value |
| SARSA - Lambda | State-action-reward-state-action with eligibility traces | Discrete | Discrete | Q-value |
| DQN | Deep Q Network | Discrete | Continuous | Q-value |
| DDPG | Deep Deterministic Policy Gradient | Continuous | Continuous | Q-value |
| A3C | Asynchronous Actor-Critic Algorithm | Continuous | Continuous | Q-value |
| NAF | Q-Learning with Normalized Advantage Functions | Continuous | Continuous | Advantage |
| TRPO | Trust Region Policy Optimization | Continuous | Continuous | Advantage |
| PPO | Proximal Policy Optimization | Continuous | Continuous | Advantage |

In some embodiments, to implement cache policy parameter optimization as a reinforcement learning task, both instantaneous and long-term rewards are determined. The gated state index or the composite state index, described above in connection with FIGS. 3-4 are used as the state index $s_t$.

In some embodiments, the state index $s_t$ is a windowed histogram of the trace of disk accesses. The number of bins $h_{bins}$ in the state index histograms will define the dimension of the state space and equals the number of elements in the vector $s_t$. The window size is denoted as $w_{size}$. The window size controls the amount of past information conveyed in the current state. In FIG. 3, the top graph shows the raw disk trace data, and the bottom graph shows the corresponding aggregate state index. At time instant t the vector $s_t$ is computed using raw data.

To model a problem using reinforcement learning, it is necessary to define the instantaneous reward r from time instant t to time instant t+1 after the agent takes a certain action $a_t$. In the context of cache system optimization, the action is a change in the parametrization of the caching policy. For example, assume that a given cache system is using a segmented least recently used cache policy, where the parameter α corresponds to the ratio between the sizes of the probatory and protected regions. The action, in this type of cache system, may be to change the value of the parameter α every 30 seconds. Accordingly, at time instant t, the agent selects a value of parameter α based on the current system state vector $s_t$. In this example, it will be assumed that the value of parameter α is selected to be 0.5. The system works for 30 seconds (time instant t+1), and then the instantaneous reward for time t is computed, which is referred to herein as Reward:$r(s_t, a_t)$. Reward $r(s_t, a_t)$ is the reward associated with system state vector $s_t$ and action $a_t$ (set α=0.5).

In the context of cache parameter optimization, an example reward can be based on the cache hit rate. Because the cache hit rate is heteroscedastic, in some embodiments the reward is based on a combination of both the cache hit rate and a baseline reward. Specifically, in some embodiments the reward function is based on a combination of both a baseline cache hit rate b and the measured cache hit rate h. The instantaneous reward $r_t$ is a function of both b and h, $r_t = f(b,h)$. In some embodiments, the instantaneous reward is calculated as $r_t = h/b$. Alternatively, in some embodiments, the instantaneous reward is calculated as $r_t = h-b$. More complex functions may also be used, depending on the implementation, for example by leveraging multiple baselines.

Figure 5:
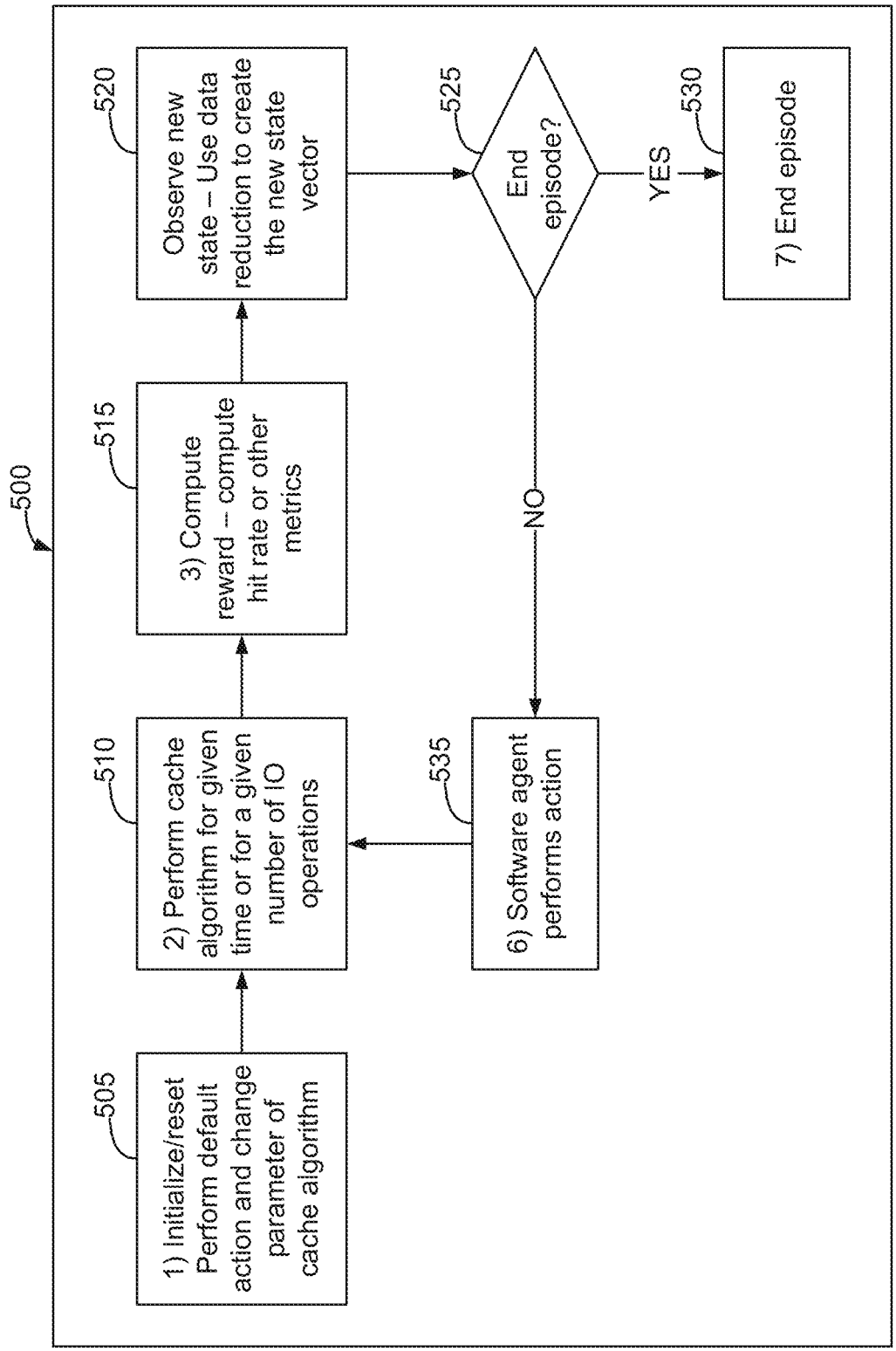
FIG. 5 is a flow chart of an example method of using reinforcement learning to dynamically tune cache policy parameters, according to some embodiments.

FIG. 5 is a flow chart of an example method of using reinforcement learning to dynamically tune cache policy parameters according to some embodiments. As shown in FIG. 5, it is assumed that the cache management system 200 of FIG. 2 has a cache parameter adjustment module 250 that is configured to enable one or more parameters of the cache control policies being used by the cache management system 200 to control operation of cache 118. In FIG. 2 the cache policies are the cache prefetch policy 230, and the cache segmentation policy 240. Accordingly, the method shown in FIG. 5 will similarly describe using reinforcement learning to adjust parameters of the cache prefetch policy 230 and cache segmentation policy 240, although other embodiments may use reinforcement learning to adjust parameters associated with other types of cache control policies.

FIG. 5 shows a virtual environment 500 configured to implement software control of a parameterized cache control process 250. As shown in FIG. 5, in some embodiments the virtual environment 500 has an initialization state (block 505). At this state, the cache parameter adjustment module 250 is reset and the parameters of the cache control policies 230, 240 are reset to their default parameters.

The virtual environment 500 then moves to the next state (block 510) in which the cache 118 operates to perform cache operations using the selected set of parameters for the cache control policies 230, 240. Specifically, in this state (block 510) the storage system 100 receives read/write events and processes the read/write events using the cache 118. The parameters of the cache control policies 230, 240 will result in some IO events resulting in cache hits and other IO events resulting in cache misses. The virtual environment 500 will remain in this state for a particular period of time or until a particular number of IO events have been processed by storage system 100 against cache 118.

The virtual environment 500 then moves to the next state (block 515) in which the instantaneous reward r is calculated. As noted above, in some embodiments the instantaneous reward r is a function of the cache hit rate. Using the cache hit rate, in isolation, can be somewhat erratic, however. Specifically, due to the nature of IO operations on the storage system, there are parts of the IO trace that naturally exhibit high (or low) cache hit rates. To counterbalance this, in some embodiments a baseline regularized instantaneous reward r is used, which shows how much better the selected parameters performed relative to a baseline b, where the baseline b is a static value selected for the algorithm. In other embodiments, the instantaneous reward r is a function of both a baseline hit rate and an instantaneous cache hit rate. As noted above, in some embodiments the instantaneous reward r is calculated as r=h/b or r=h−b, although other algorithms may likewise be used to compute the reward.

The virtual environment 500 then moves to the next state (block 520) in which the state vector $s_t$ is computed, describing the overall state of the disk requests. As noted above, the state vector describes the IO operations on the cache 118 or traffic features that can be derived from IO operations on the cache 118.

The virtual environment 500 then moves to the next state (block 525) in which a check is performed to determine if an end state has been reached. An end state, in some embodiments, is a point where it is desirable to reset the controller or where the cache system finalized some work block. If an end state has been reached (a determination of YES at block 525) that defines the end of a cache control episode (block 530). In the context of reinforcement learning, each episode will be used for agent training purposes. The virtual environment 500 will then go back to the initialization stage (block 505) and the process (blocks 505-535) will iterate in subsequent cache control episodes.

If the cache control episode has not ended (a determination of NO at block 525), the virtual environment 500 then moves to the next state (block 535) in which a new action is selected. Specifically, a set of new parameters for the cache control policies is selected based on the current state vector $s_t$. The new parameters for the cache control policies are then used in block 510 for a subsequent control interval. This process iterates until the cache control episode ends at block 525.

In some embodiments, the action is selected based on reinforcement learning, in which the software agent operates to attempt to maximize the reward r based on the current state vector $s_t$. The virtual agent will receive the state vector $s_t$, and will perform an action. In this case the action is to change the parameters of the cache algorithm being used by the cache parameter adjustment module 250 to specify operation of the cache 118. In some embodiments, the set of possible actions is predefined, so that the reinforcement learning process has a fixed number of possible actions. For example, assume that the reinforcement learning process is tasked with optimizing a parameter of a cache control policy that ranges from 0 to 100. The reinforcement learning process can be restricted to discretizing this range into a select number of possible steps. For example, the range of 0-100 could be discretized into 11 possible steps, i.e. action one: set value to zero; action two; set value to 10. Discretizing the range into a select number of possible steps makes it is easier for the reinforcement learning algorithm to converge.

The finer the discretization, the harder it is for the reinforcement learning algorithm to converge. When a reinforcement learning process attempts to optimize more than one cache problem, this convergence can be more elusive. For example, assume that a reinforcement learning process is seeking to optimize two parameters, both of which range from 0-100. If each range is discretized into 11 possible steps, that means that the reinforcement learning algorithm has a total of 121 possible actions (11×11). The large number of actions poses a heavy impact in the convergence of the algorithm.

To reduce the size of the action space, in some embodiments where the reinforcement learning process is configured to optimize multiple cache policy parameters, the reinforcement learning process is constrained to only choose one parameter to optimize at each iteration of block 535. Thus, for example, if the reinforcement learning process is required to optimize two cache policy parameters, and each is discretized into 11 possible steps, this reduces the reinforcement learning process to having a total of only 22 actions—11 actions to change the first cache policy parameter and 11 actions to change the second cache policy parameter. By reducing the number of actions, it is possible to make the reinforcement learning process converge more quickly and the resultant trained reinforcement learning process is more robust.

Figure 6:
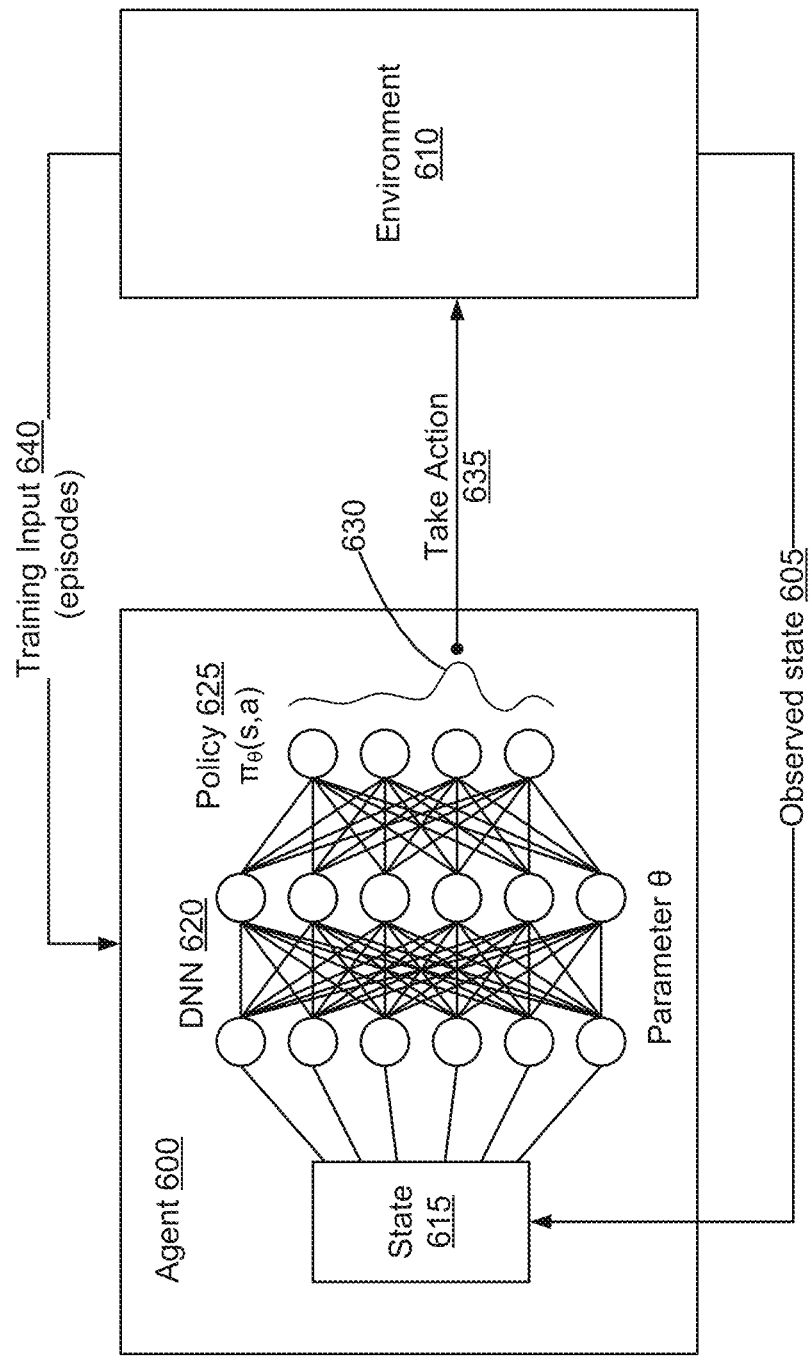
FIG. 6 is a functional block diagram of a reinforcement learning process connected to an environment, according to some embodiments.

FIG. 6 is a functional block diagram of a reinforcement learning process 600 connected to an environment 610, according to some embodiments. As shown in FIG. 6, in some embodiments a software agent 600 receives the observed state 605 of an environment 610 and applies the observed state as input 615 to a deep neural network 620. The deep neural network provides, as output, cache policy parameters 625 of the cache policies 230, 240 under the control of the cache parameter adjustment module 250.

The cache policy parameter associated with greatest anticipated reward 630 is selected by the software agent 600 and applied as input to the environment 635. This process is described in greater detail above in connection with FIG. 5. This process iterates periodically to enable the software agent 600 to control operation of the environment, observe changes to the state of the environment, determine reward values correlating with the state of the environment and action, and take additional actions until the episode ends (a determination of YES at block 525 in FIG. 5). When the episode ends, the episode is provided as training input 640 to deep neural network 630, to enable deep neural network 630 learn the relationship between the environment state, selected action, and reward. In this manner, the deep neural network 620 is incrementally trained using reinforcement learning to learn which action should be taken in a given observed environment state to achieve the highest reward.

In some embodiments, the software agent 600 is configured to receive, as input, the system state vector $s_t$ and compute the best action $a_t$ in that state. After that action the environment goes to a new state $s_{t+1}$ and a reward $r_t$ is computed. Intuitively, $r_t$ is a number that represent the 'quality' of the transition from $s_t$ to $s_{t+1}$—if it is good or bad. In the case of cache parameter tuning, the reward is based in the hit rate and potentially other metrics.

The use of reinforcement learning enables optimized cache parameter selections to be learned through trial and error, without explicitly training the deep neural network 620 in advance. One disadvantage of methods based on reinforcement learning is the possibly high time to convergence (i.e., the need for many samples). Nonetheless, through proper initialization, it is possible to reduce convergence times.

Reinforcement learning is a principled way to learn the optimal parameter tuning through trial and error, balancing exploitation and exploration to maximize the utility (e.g., hit rate) over a given horizon. Under the reinforcement learning framework, the action executed at a given point in time (e.g., evicting a content) typically has implications over multiple time slots (e.g., hit and miss rates over the next few requests). This way, each action takes into account not only for its instantaneous reward but also for its long-term impact over an episode (e.g., a certain trace of requests).

Figure 7:
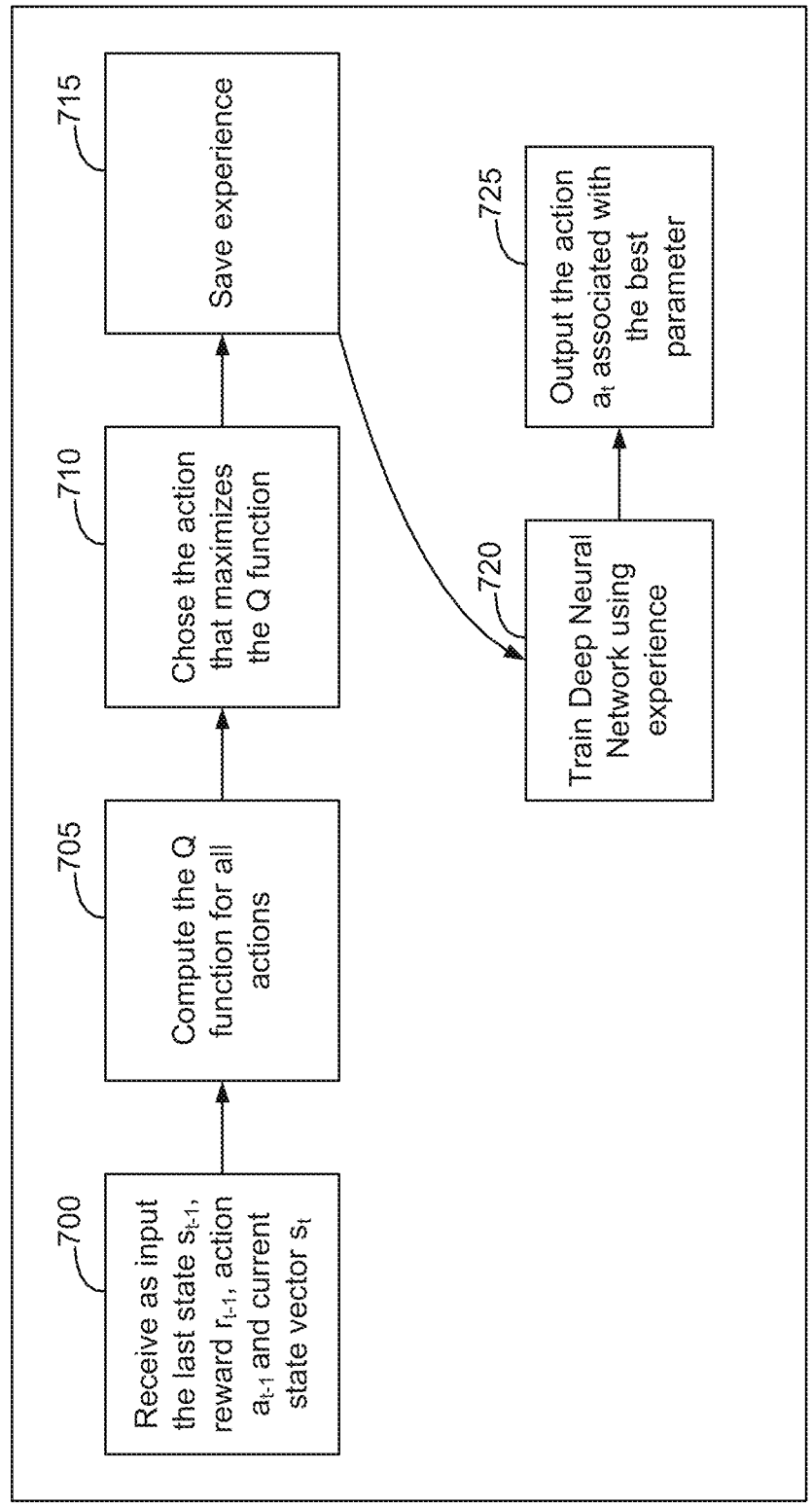
FIG. 7 is a flow chart of an example method of training a reinforcement learning process implemented as a DQN (Deep Q-Network) to learn to dynamically tune cache policy parameters, according to some embodiments.

In some embodiments, the software agent 600 is a Deep Q Network (DQN), as shown in FIG. 7. Under Q-learning, the aim is to learn the Q-function Q(s, a), which maps each state-action pair to its expected future reward value. The DQN-agent represents the Q-Function as a Deep Neural Network, and learns its weights interactively looking at the rewards after each taken action. To select the best action, the software agent 600 uses its DNN 620 and the current state of the environment 610, and picks the action associated with the greatest predicted value 630.

The advantage of using a DQN-agent is that the DQN-agent learns during the execution of the cache policy. When it performs its initial actions, the deep neural network 620 is initialized with random weights, and the agent actions are also random. After each action, in the new obtained state, an experience vector $[s_{t-1}, a_{t-1}, r_{t-1}, s_t]$ is stored that includes the previous state, the action, the reward and the current state, in set (episode) of recent experiences. If that set of experience vectors becomes too large, the older entries can be erased. After a predefined number of performed actions, some of this experiences are selected to create a sample batch to train the deep neural network 620, such that each sample of the batch is created using the equation:

$$[Q(s_{t-1},a_1), \ldots, Q(s_{t-1},a_t), \ldots, Q(s_{t-1},a_n)] \quad (1)$$

where, Q is the actual output of the deep neural network $$Q(s_{t-1},a_{t-1}) = r_t + \gamma \, \text{Max}([Q(s_{t-1},a_1), \ldots, Q(s_{t-1},a_n)])$$

and γ is a hyperparameter value in the interval [0,1] that controls the speed of learning.

FIG. 7 is a flow chart of an example method of training a DQN network to learn to dynamically tune cache policy parameters, according to some embodiments. As shown in FIG. 7, to train the DQN network, the software agent 600 receives, as input, the last state $s_{t-1}$, reward $r_{t-1}$, action $a_{t-1}$ and current state vector $s_t$ (block 700). The software agent then computes the Q function for all actions (block 705) using the state vector and the DNN 620 to make predictions for the expected total episode reward for every action. The software agent then chooses the action that maximizes the Q function (block 710). Specifically, the software agent selects the best action $a_t$ 630 associated with the best value computed in block 705.

Once the action has been selected, the action is applied to the cache 118 by causing the cache parameter adjustment module 250 to take the selected action 630 on the cache 118 to adjust the cache parameter associated with the selected best action $a_t$. The software agent 600 then saves the experience vector $[s_t, a_{t-1}, r_{t-1}, s_{t-1}]$ in set of recent experiences (block 715). If there are too many experiences, the oldest experience is removed to make space.

A sample batch of experience is then created and used to train the deep neural network (block 720). In some embodiments, the batch is created using equation (1). The incrementally trained deep neural network 620 is then used, in subsequent intervals, to select actions a based on the state s of the cache 118 (block 725). This process iterates as the DNN 620 is incrementally trained over time.

Figure 8:
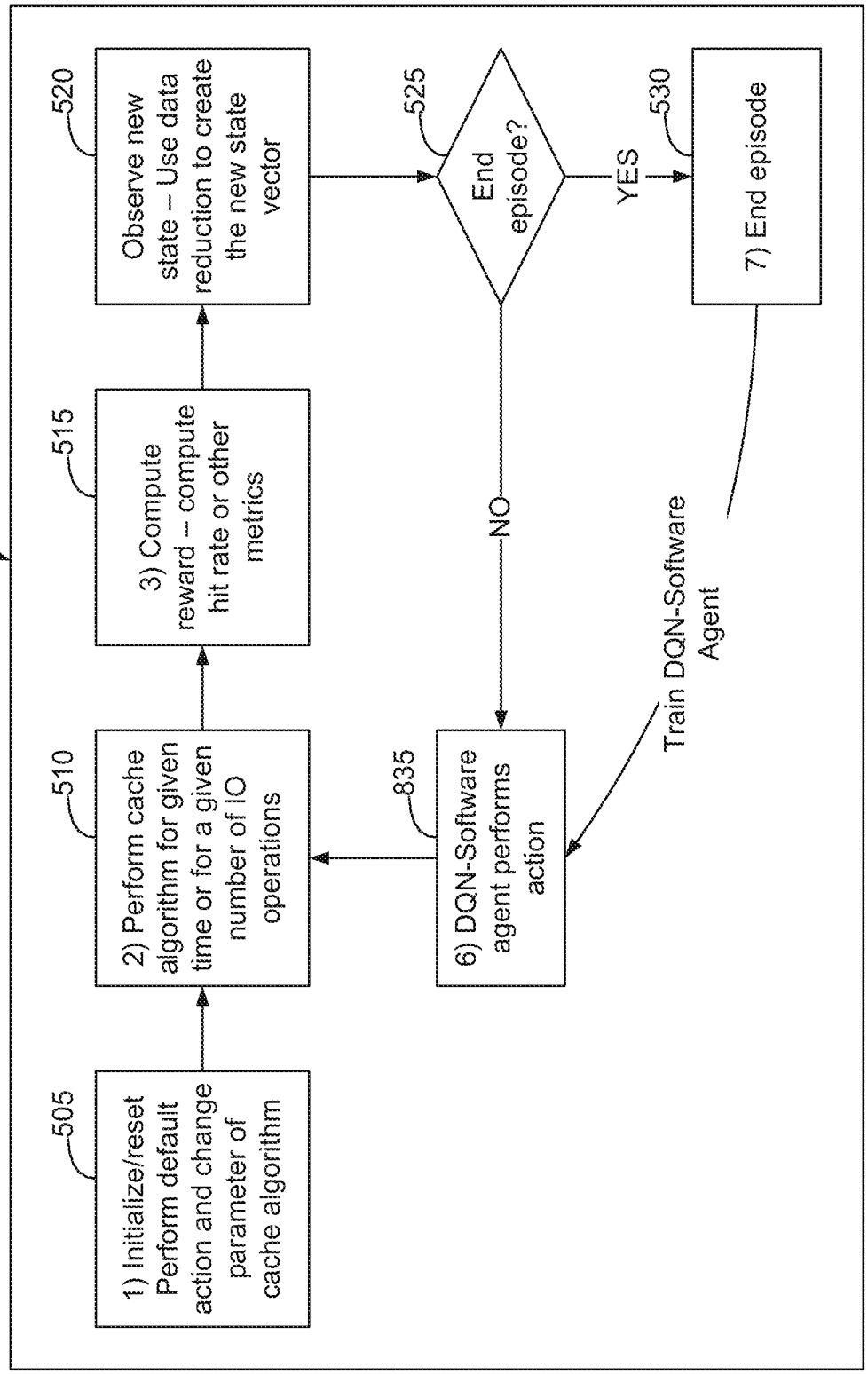
FIG. 8 is a flow chart of an example method of using a trained DQN network to dynamically adjust cache policy parameters, according to some embodiments.

FIG. 8 is a flow chart of an example method of using a trained DQN network to dynamically tune cache policy parameters, according to some embodiments. The blocks shown in FIG. 8 are the same as the blocks shown in FIG. 5, with the exception that in FIG. 8 the software agent used in block 835 is a Deep Q Network (DQN) software agent of FIG. 6, that has been trained using the process shown in FIG. 7. As used herein, the term "DQN software agent" is used to refer to a virtual agent that receives, as input, the last state $s_{t-1}$, reward $r_{t-1}$, action $a_{t-1}$ and current state vector $s_t$, and selects an action to perform based on these inputs. In this case the action is to change one of the parameters of the cache control algorithm 230, 240 being used by the cache parameter adjustment module 250 to manage operation of cache 118.

Figure 9:
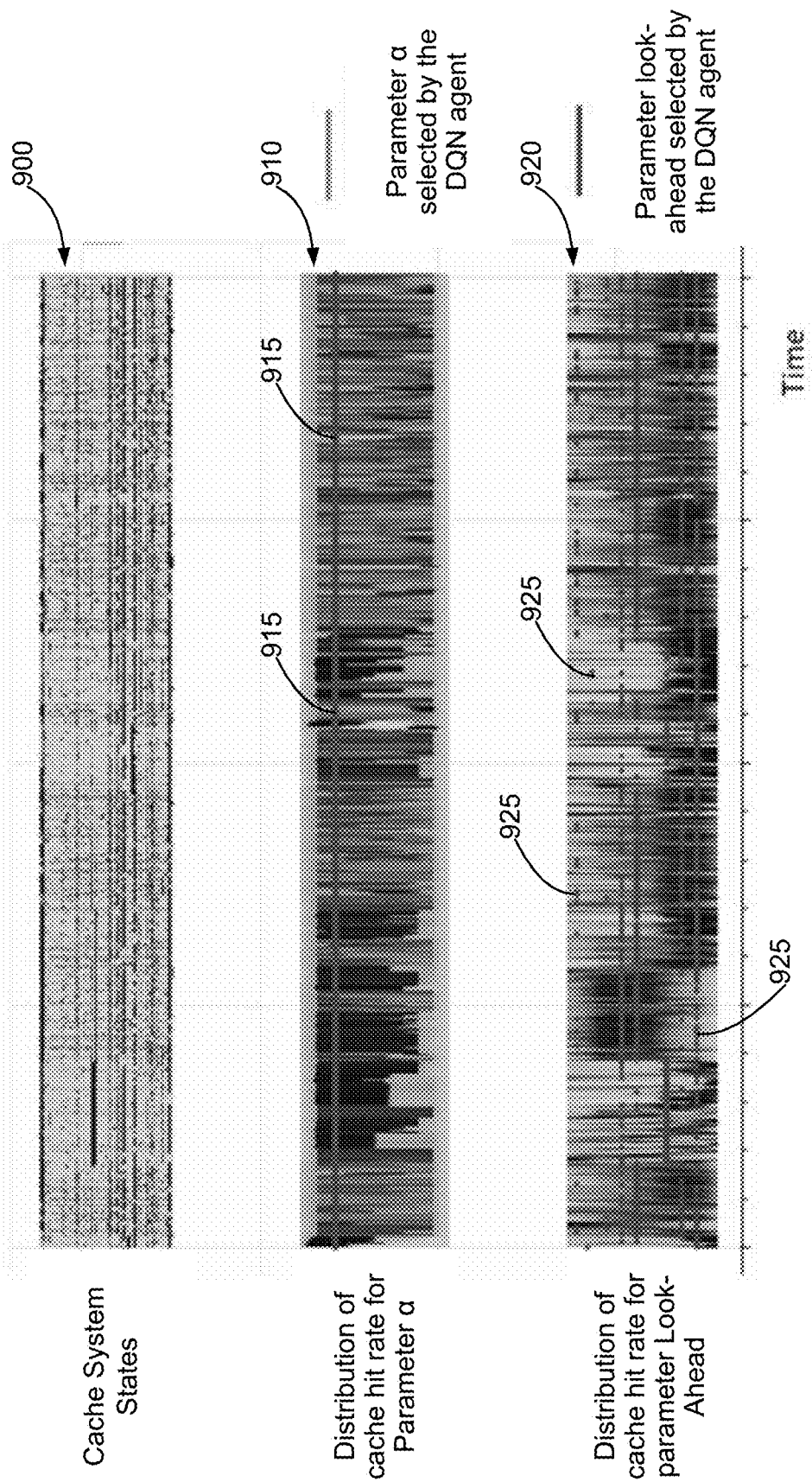
FIGS. 9-11 are graphs showing experimental results of using a trained reinforcement learning process to dynamically tune cache policy parameters, according to some embodiments.
Figure 10:
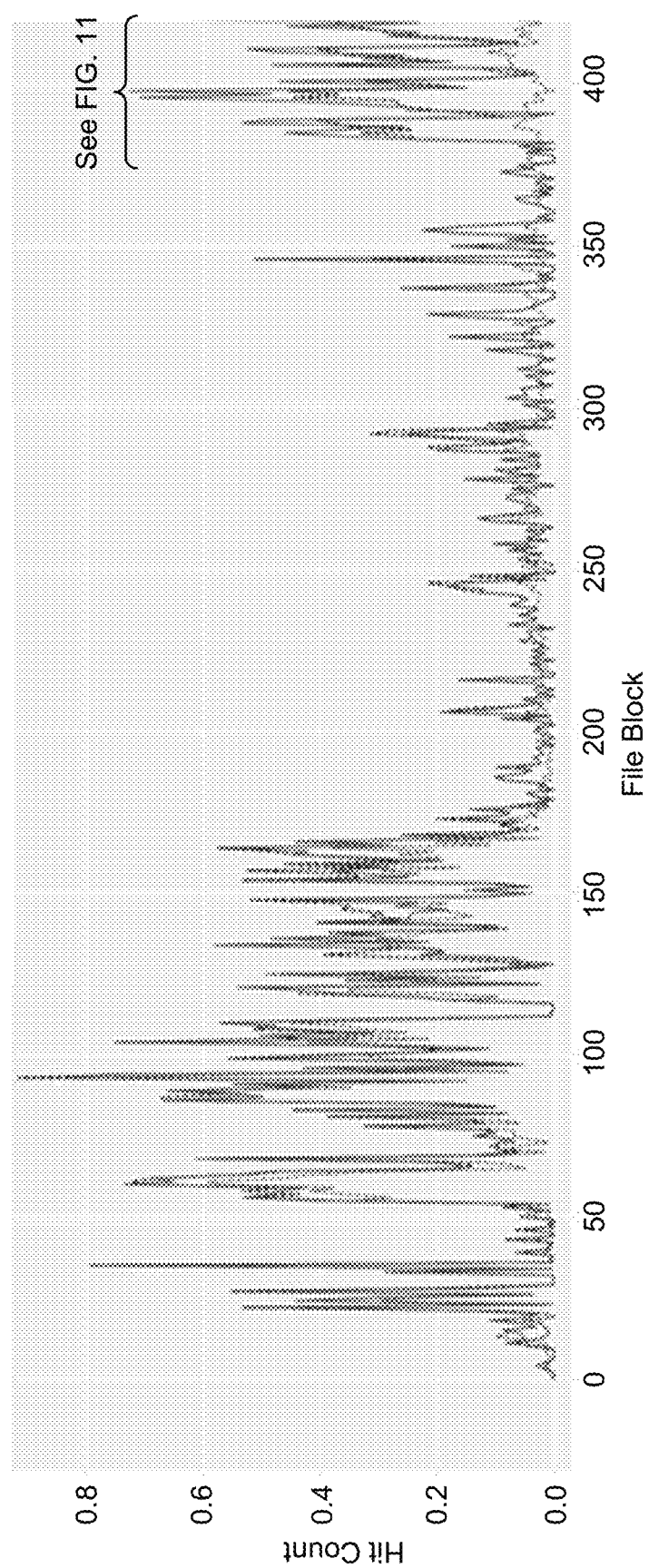
Figure 11:
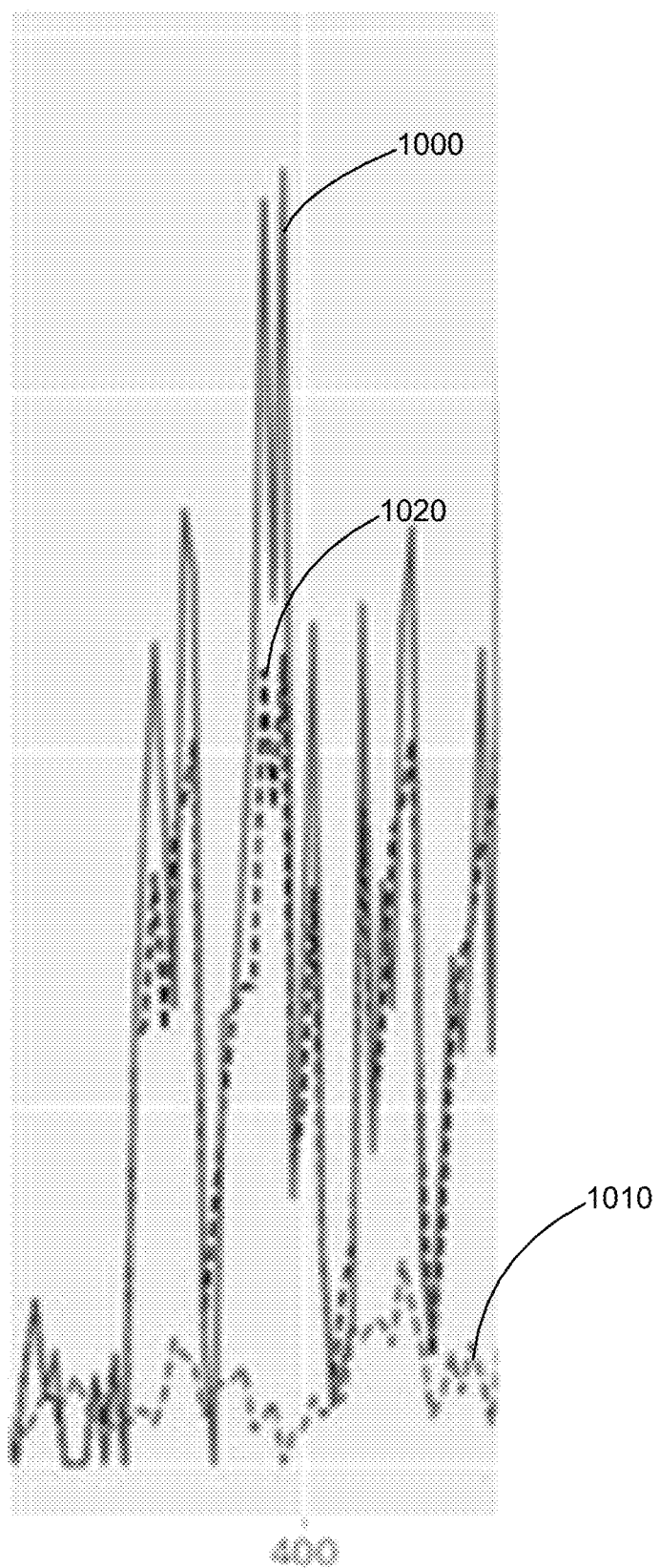

FIGS. 9-11 are graphs showing experimental results of using a trained reinforcement learning process to dynamically tune cache policy parameters, according to some embodiments. These graphs show application of a DQN-agent for optimization of the look-ahead and α parameters from a look-ahead-LRU algorithm, which was simulated using actual trace data captured from a storage system.

In this example, for simplicity, each sample in the trace was considered as an event, and the time for each event was set as the index of the sample. This means that the $12^{th}$ sample in the trace occurred at time 12.

It was assumed that the cache parameters could be changed periodically, and that the DQN agent could perform 20 different actions: the first ten actions enabling the DQN agent to choose between 10 possible values for parameter α, and the last ten actions enabling the DQN agent to choose between 10 possible values for the look-ahead parameter. After performing the training, the DQN-agent was applied to the trace. The result is shown in FIG. 9, in which the top graphic 900 shows the states vectors for all times, the middle graphic 910 shows the dynamically tuned value for α 915, and in the background the simulated ground truth for hit rate. The bottom graphic 920 shows the dynamically tuned value for look-ahead parameter 925, and in the background the simulated ground truth hit rate.

As shown in the middle graphic 910 of FIG. 9, the DQN agent converged on a cache segmentation value of α=0.8 (915) that is a local optimal for the ratio between the sizes of the probatory and protected regions for use in the segmented least recently used cache policy. However, as shown in the bottom graphic 920, the DQN agent frequently adjusted the selected value of the look-ahead parameter 925, such that the value of the look-ahead parameter 925 followed the darker areas of the distribution hit rate, which shows that the DQN-agent learned a good policy.

FIG. 10 is a graph showing the cache hit rate using three different cache management approaches to specifying the cache segmentation parameter and the cache look-ahead parameter:

Line 1000 shows the cache hit rate when a trained DQN agent was used to control the value of the cache segmentation parameter α and the cache look-ahead parameter associated with the cache algorithm controlling operation of the cache 118.

Line 1010 shows the cache hit rate when a fixed cache segmentation parameter of α=0.8 was used, and the look-ahead parameter was set such that the cache algorithm controlling operation of the cache 118 did not implement any look-ahead.

Line 1020 shows the cache hit rate when a fixed cache segmentation parameter of α=0.8 was used, and the look-ahead parameter was set to 2000 (blocks), which are the bests possible parameters for this trace.

FIG. 11 shows the results of FIG. 10 in greater detail, particularly in the area surrounding file block 400. The results in FIGS. 10 and 11 show times in which line 1000 (cache hit rate based on reinforcement learning) obtained a hit rate that exceeded line 1020 (optimal value for this particular trace). This apparently odd behavior is due to the 'optimal value' being computed in relation to short term optimization—it selects the parameters that are locally optimal. The reinforcement learning approach, on the other hand, indicates that the software agent 600 can take actions using a larger decision horizon. It may decide, for example, to keep some data in the cache that will be used later. This comprises a disadvantage in the short term but ultimately results in better performance in the long run.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for using reinforcement learning to dynamically tune cache policy parameters, the computer program including a set of instructions which, when executed by a computer, cause the computer to perform a method comprising the steps of:
creating a structured state index characterizing the current state of a workload on a cache;
providing the structured state index to a reinforcement learning process;
using, by the reinforcement learning process, the structured state index to select an action to be taken to adjust a value of a parameterized cache policy used to control operation of a cache;
using the adjusted value of the parameterized cache policy for a time interval;
determining a reward associated with the action; and
iterating the steps of providing the structured state index to the reinforcement process, using the structured state index to select the action, using the adjusted value, and determining the reward to create a training episode for the reinforcement learning process.

2. The non-transitory tangible computer readable storage medium of claim 1, wherein the step of using, by the reinforcement learning process, the structured state index to select the action to be taken to adjust the value of the parameterized cache policy used to control operation of a cache comprises selecting one of at least two parameterized cache policies and selecting the action to be taken by adjusting the value of the selected one of the parameterized cache policies.

3. The non-transitory tangible computer readable storage medium of claim 2, wherein the step of using the structured state index to select the action comprises adjusting only one parameter of one of the parameterized cache policies during each iteration.

4. The non-transitory tangible computer readable storage medium of claim 2, wherein a first of the parameterized cache policies is a prefetch policy specifying a size of a look-ahead window for prefetching blocks of data to the cache, and a second of the parameterized cache policies is a segmentation policy specifying a ratio of the cache that is used for probatory and protected cache items.

5. The non-transitory tangible computer readable storage medium of claim 1, wherein the step of determining the reward associated with the action comprises comparing a cache hit rate with a baseline cache hit rate.

6. The non-transitory tangible computer readable storage medium of claim 5, wherein the reward is computed as a difference between the cache hit rate and the baseline cache hit rate.

7. The non-transitory tangible computer readable storage medium of claim 5, wherein the reward is computed as a ratio between the cache hit rate and the baseline cache hit rate.

8. The non-transitory tangible computer readable storage medium of claim 1, wherein the structured state index is formed as a vector, in which each element of the vector is formed from a number of accesses in a contiguous region of storage over a predetermined previous window of time.

9. The non-transitory tangible computer readable storage medium of claim 1, wherein the reinforcement learning process is implemented using a Deep Neural Network.

10. The non-transitory tangible computer readable storage medium of claim 9, wherein the reinforcement learning process is a Q-learning process.

11. The non-transitory tangible computer readable storage medium of claim 1, further comprising resetting parameters of the parameterized cache policies at the end of each episode.

12. A method of using reinforcement learning to dynamically tune cache policy parameters, the method comprising the steps of:
creating a structured state index characterizing the current state of a workload on a cache;
providing the structured state index to a reinforcement learning process;
using, by the reinforcement learning process, the structured state index to select an action to be taken to adjust a value of a parameterized cache policy used to control operation of a cache;
using the adjusted value of the parameterized cache policy for a time interval;
determining a reward associated with the action; and
iterating the steps of providing the structured state index to the reinforcement process, using the structured state index to select the action, using the adjusted value, and determining the reward to create a training episode for the reinforcement learning process.

13. The method of claim 12, wherein the step of using, by the reinforcement learning process, the structured state index to select the action to be taken to adjust the value of the parameterized cache policy used to control operation of a cache comprises selecting one of at least two parameterized cache policies and selecting the action to be taken by adjusting the value of the selected one of the parameterized cache policies.

14. The method of claim 13, wherein the step of using the structured state index to select the action comprises adjusting only one parameter of one of the parameterized cache policies during each iteration.

15. The method of claim 13, wherein a first of the parameterized cache policies is a prefetch policy specifying a size of a look-ahead window for prefetching blocks of data to the cache, and a second of the parameterized cache policies is a segmentation policy specifying a ratio of the cache that is used for probatory and protected cache items.

16. The method of claim 12, wherein the step of determining the reward associated with the action comprises comparing a cache hit rate with a baseline cache hit rate, and computing either a difference between the cache hit rate and the baseline cache hit rate or a ratio between the cache hit rate and the baseline cache hit rate.

17. The method of claim 12, wherein the structured state index is formed as a vector, in which each element of the vector is formed from a number of accesses in a contiguous region of storage over a predetermined previous window of time.

18. The method of claim 12, wherein the reinforcement learning process is implemented using a Deep Neural Network.

19. The method of claim 18, wherein the reinforcement learning process is a Q-learning process.

20. The method of claim 12, further comprising resetting parameters of the parameterized cache policies at the end of each episode.

* * * * *